UNITED STATES PATENT OFFICE.

WILHELM HERZBERG AND OSWALD SCHARFENBERG, OF BERLIN, GERMANY, ASSIGNORS TO ACTIEN GESELLSCHAFT FÜR ANILIN FABRIKATION, OF BERLIN, GERMANY.

TRIPHENYLMETHANE DYE AND PROCESS OF MAKING SAME.

No. 835,682.   Specification of Letters Patent.   Patented Nov. 13, 1906.

Application filed February 3, 1906. Serial No. 299,284. (Specimens.)

*To all whom it may concern:*

Be it known that we, WILHELM HERZBERG and OSWALD SCHARFENBERG, of Berlin, in the Kingdom of Prussia, German Empire, have invented new and useful Improvements in new Dyestuff of the Triphenylmethane Series and Process of Making Same; and we do hereby declare that the following is a full, clear, and exact description thereof, which will enable others skilled in the art to which it appertains to make and use the same.

Our present invention relates to the manufacture of a new dyestuff of the triphenylmethane series, as we have found that by condensing ortho-amidophenyl-ether-para-sulfonic acid

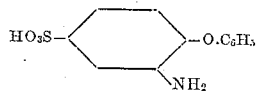

with tetraethyldiamidobenzhydrole, introducing a second sulfonic group into the condensation product and then substituting a hydrogen atom for the amido group, there is obtained a new leuco compound the corresponding oxidation product of which is a new and very valuable acid dyestuff dyeing wool from an acid-bath clear greenish-blue shades of a good fastness to alkalies. The new coloring-matter possesses also level dyeing.

In order to illustrate our invention, we give the following example, the parts of which being by weight: Sixty-five parts of tetraethyldiamidobenzhydrole and fifty-four and one-half parts of ortho-amidophenyl-ether-para-sulfonic acid are dissolved together in five hundred parts of water with the addition of thirty-two parts of concentrated sulfuric acid, (66° Baumé.) This mixture is heated to 95°–100° centigrade during twenty-four hours. On cooling the condensation product separates out as sulfate in the shape of small brilliant leaves and is isolated in the usual manner. One hundred parts of the sulfate thus obtained are poured into two hundred parts of concentrated sulfuric acid of one-hundred-per-cent. strength ("monohydrate") and the mass heated to 60°–70°, the end of the reaction being shown by the fact that a sample of the mass dissolves totally in a solution of sodium carbonate. In order to isolate the disulfonic acid formed, the mass is diluted with three hundred to four hundred parts of ice and water and then allowed to stand for some time, whereafter the largest part of the reaction product separates out also as sulfate. It is isolated by filtering and drying.

Eliminating the amido group is carried out as follows: One prepares an aqueous solution of the diazo compound of the above disulfonic acid by dissolving seventy-nine and one-half parts of its sodium salt (of 87.6 per cent. strength) in one hundred and eighty parts of water, with the addition of twenty parts of concentrated sulfuric acid, (66° Baumé,) and diazotizing by means of a concentrated solution of seven parts of sodium nitrite. Diazotization being finished, the mass is mixed with two hundred parts of alcohol, whereafter about three parts of cuprous oxid are added while stirring well. The reaction begins at once, nitrogen gas being evolved. As soon as the diazo compound has totally decomposed the alcohol is distilled off.

In order to form the dyestuff by oxidation of the leuco-sulfonic acid, one may use the solution freed from alcohol as above and filtered from the copper. The oxidation is then performed in the usual manner by means of lead peroxid ($PbO_2$) and sulfuric acid. After oxidation the solution is separated from the lead sulfate formed during the reaction by filtering. The dyestuff is then precipitated by means of sodium sulfate and isolated by filtering and drying. It is thus obtained in the shape of a mass having a luster like copper and easily dissolving in water and alcohol to a green-blue colored solution. The green-blue aqueous solution of the dye is changed to green by the addition of some mineral acid. On the addition of an excess of mineral acid it assumes a yellow coloration. Furthermore, when soda-lye is added to an aqueous solution in the cold or at ordinary temperature no change occurs, whereas on boiling such a solution a violet coloration is produced, the dyestuff being decomposed. In concentrated sulfuric acid the dyestuff dissolves with a weakly yellow coloration. Some drops of water added thereto produce an intense yellow color, whereas on adding more water the mass assumes a yellow-green coloration.

It is obvious to those skilled in the art that our present invention is not limited to the above example nor to the details given therein. So, for instance, instead of first sulfonating the above condensation product and then eliminating the amido group these operations may also be performed in the opposite succession. Furthermore, the isolation of the disulfonic acid may be carried out in any other suitable manner—as, for instance, by preparing the calcium salts from the reaction mass—thus being produced the soluble calcium salt of the disulfonic acid which is separated by filtration from the insoluble calcium sulfate.

As to the oxidation of the leuco-disulfonic acid, for the lead peroxid in conjunction with sulfuric acid employed in the above example there may be substituted another suitable oxidizing mixture or compound—as, for instance, pyrolusite ($MnO_2$) in conjunction with sulfuric acid or the like.

Instead of the sulfuric acid used above for the condensation of ortho-aminophenylether-para-sulfonic acid with tetraethyl-diamidobenzhydrol another acid-condensing agent, such as hydrochloric acid or the like, may be employed.

Having now described our invention and the manner in which the same has to be performed, what we claim is—

1. The herein-described process of making a new dyestuff of the triphenylmethane series which process consists in condensing ortho-aminophenylether-para-sulfonic acid with tetraethyl-diamidobenzhydrol, converting the condensation product into a disulfonic acid, eliminating the $NH_2$ group and substituting therefor a hydrogen atom and finally oxidizing the leuco compound thus obtained to the dyestuff.

2. The hereinbefore-described process of making a new dyestuff of the triphenylmethane series which process consists in condensing ortho-aminophenylether-para-sulfonic acid with tetraethyl-diamidobenzhydrol by means of sulfuric acid, sulfonating the condensation product with concentrated sulfuric acid, eliminating from the disulfonic acid formed the $NH_2$ group by diazotizing it and treating the diazo compound with alcohol in the presence of copper and finally oxidizing the leuco compound thus obtained to the dyestuff by means of manganese peroxid and sulfuric acid.

3. As a new article of manufacture the hereinbefore-described new dyestuff of the triphenylmethane series, being in the shape of the sodium salt a mass having a luster like copper, easily dissolving in water and alcohol to a green-blue solution, the aqueous solution of which dyestuff is changed to green by the addition of some mineral acid, whereas an excess of mineral acid produces a yellow coloration, and the aqueous solution of which dyestuff is not changed in its coloration by the addition of soda-lye in the cold or at ordinary temperature, whereas such an aqueous solution on boiling with soda-lye assumes a violet coloration, the dyestuff being decomposed, and this dyestuff dissolving in concentrated sulfuric acid to a weakly yellow solution, which solution on addition of some drops of water assumes an intense yellow color, whereas on adding more water a yellow-green coloration is produced, and which dyestuff produces on wool, when dyed from an acid-bath, clear greenish-blue tints of a good fastness to alkalies.

In witness whereof we have hereunto signed our names, this 20th day of January, 1906, in the presence of two subscribing witnesses.

WILHELM HERZBERG.
OSWALD SCHARFENBERG.

Witnesses:
　WOLDEMAR HAUPT,
　HENRY HASPER.